United States Patent [19]

Djiauw et al.

[11] Patent Number: 5,492,967
[45] Date of Patent: Feb. 20, 1996

[54] IMPACT MODIFICATION OF POLYPROPYLENE WITH STYRENE/ISOPRENE TETRABLOCK COPOLYMERS

[75] Inventors: Lie K. Djiauw; Michael J. Modic, both of Houston; Richard Gelles, Sugar Land; Glenn R. Himes, Houston, all of Tex.

[73] Assignee: Shell Oil Company, Houston, Tex.

[21] Appl. No.: 305,612

[22] Filed: Sep. 14, 1994

Related U.S. Application Data

[63] Continuation of Ser. No. 147,217, Nov. 3, 1993, abandoned.

[51] Int. Cl.⁶ .................................................. C08L 53/02
[52] U.S. Cl. ................................. 525/98; 528/89
[58] Field of Search ............................. 525/98, 89

[56] References Cited

U.S. PATENT DOCUMENTS

| | | | |
|---|---|---|---|
| 4,904,731 | 2/1990 | Holden | 525/98 |
| 5,045,589 | 9/1991 | Ueno . | |

FOREIGN PATENT DOCUMENTS

| | | |
|---|---|---|
| 0050943 | 5/1981 | Japan . |
| 0149939 | 8/1984 | Japan . |
| 61-155446 | 7/1986 | Japan . |
| 1-2617 | 1/1989 | Japan . |
| 5045589 | 9/1991 | Japan . |
| 5086109 | 2/1992 | Japan . |
| 5-51494 | 3/1993 | Japan . |

*Primary Examiner*—Joseph L. Schofer
*Assistant Examiner*—Irina Zemel
*Attorney, Agent, or Firm*—Keith M. Tackett

[57] ABSTRACT

Compositions consisting essentially of from 60% to 95% by weight of the polymer components of a high flow polypropylene and from 40% to 5% by weight of a polystyrene-hydrogenated polyisoprene-polystyrene-hydrogenated polyisoprene block copolymer have excellent low temperature impact strength and high heat distortion temperature for molding large automobile parts.

2 Claims, No Drawings

IMPACT MODIFICATION OF POLYPROPYLENE WITH STYRENE/ISOPRENE TETRABLOCK COPOLYMERS

This is a continuation of application Ser. No. 08/147,217, filed Nov. 3, 1993, now abandoned.

FIELD OF THE INVENTION

The invention relates to compositions that contain polyolefin resins and elastomeric block copolymers. More specifically, the invention relates to polypropylene molding compositions that have improved impact resistance.

BACKGROUND OF THE INVENTION

Polypropylene molding compositions containing low or medium flow polypropylene have good impact resistance when the composition includes a high molecular weight styrenic block copolymer having the structure polystyrene-hydrogenated polybutadiene-polystyrene, e.g. KRATON® G1650 thermoplastic elastomer. The impact strengths are suitable for use of the molding compositions in large automotive parts. However, research has established that polypropylene molding compositions for large automotive parts must also have improvements in rigidity, heat deformation resistance, low temperature impact resistance, and surface appearance.

High flow polypropylene molding compositions that are suitable for large automotive parts except for inferior low temperature impact strength and inferior high temperature heat deformation are produced by blending low molecular weight triblock copolymers of polystyrene-hydrogenated polybutadiene-polystyrene with low molecular weight diblock copolymers of polystyrene-hydrogenated butadiene. A blend of the triblock and diblock copolymers is commercially available as KRATON® G1657 elastomer which is available from Shell.

U.S. Pat. No. 5,045,589 describes much improved polypropylene molding compositions comprising a crystalline ethylene/propylene block copolymer, an amorphous polypropylene copolymer, and a thermoplastic elastomer which can be a polystyrene-hydrogenated polybutadiene-polystyrene elastomer, e.g. KRATON® G1650 elastomer, or a polystyrene-hydrogenated polyisoprene-polystyrene elastomer.

SUMMARY OF THE INVENTION

The present invention provides a high flow polypropylene molding composition that is excellent for large automobile parts, the polypropylene composition containing a low molecular weight polystyrene-hydrogenated polyisoprene-polystyrene-hydrogenated polyisoprene elastomer which is superior to butadiene based elastomers for improving low temperature impact strength and high temperature heat distortion. The isoprene based tetrablock polymers are also excellent modifiers for blends containing ethylene/propylene block polymers.

DETAILED DESCRIPTION OF THE INVENTION

Polypropylene molding compositions comprising 60–95%, preferably 80–95%, by weight of the polymer components of a high flow polypropylene homopolymer or copolymer and 40–5%, preferably 20–5%, by weight of the polymer components of a low molecular weight polystyrene-hydrogenated polyisoprene-polystyrene-hydrogenated polyisoprene block copolymer, wherein the polystyrene endblocks have a peak molecular weight from 4,500 to 8,000, preferably 5,500 to 7,000, the hydrogenated polyisoprene midblocks have a peak molecular weight from 35,000 to 55,000, preferably 40,000 to 50,000, the polystyrene midblocks have a peak molecular weight from 4,500 to 9,000, preferably from 6,000 to 8,500, and the hydrogenated polyisoprene endblock have a peak molecular weight that is from 15% to 35%, preferably 20% to 30%, of the peak molecular weight of the hydrogenated polyisoprene midblocks, have excellent physical and appearance properties including superior low temperature impact strength and superior high temperature heat deformation.

The high flow polypropylene can be (i) a homopolymer of propylene, (ii) a random copolymer of propylene and an olefin selected from ethylene and $C_4$–$C_m$ alpha-olefins, or (ii) a random terpolymer of propylene with two alpha-olefins selected from the group consisting of ethylene and $C_4$–$C_m$ alpha olefin, provided that the propylene polymer has a melt flow higher than 30 dg/min as measured by ASTM D1238-82 (230° C./5 kg). Preferably, the polypropylene has a melt flow from 50 to 80 dg/min. The $C_4$–$C_{10}$ alpha-olefins include linear and branched $C_4$–$C_{10}$ alpha-olefins such as 1-butene, 1-pentene, 4-methyl-pentene-1, 3-methyl-1-butene, 1-hexene, 3-4-dimethyl-1-butene, 1-heptene, 3-methyl-1-hexene, 1-octene and the like.

The hydrogenated polyisoprene blocks have a residual unsaturation less that 5%, preferably less than 2%, and may have from 30% to 100% 1,4-addition of the isoprene. The block copolymers are readily prepared by anionic polymerization and selective hydrogenation processes known in the art to give polymers having low polydispersity.

The polypropylene molding compositions could further contain polyethylene-polypropylene block copolymers as described in U.S. Pat. No. 5,045,589 which is incorporated by reference herein.

Fillers and reinforcing agents, e.g. carbon black and glass fibers, as well as inorganic powders such as calcium carbonate, talc, mica, and glass, may be included in the composition of the invention at concentration levels up to about 80 parts by weight per 100 parts by weight of the total polymer components. In addition to the economic benefit such fillers afford, greater stiffness and a higher heat distortion temperature can be attained.

The components of the composition can be blended or admixed in any conventional mixing apparatus, such as an extruder or a Banbury mixer.

EXAMPLES

The following examples, presented for illustrative purposes, describe various embodiments of the polypropylene molding composition of the invention.

In all of the examples and control experiments, the polypropylene and the S-EP-S-EP block copolymer, as well as any other modifier used in comparison, were mixed and extruded in a single pass through a co-rotating twin-screw extruder. A stabilizer composition (0.08 weight %), known as Irganox 1010, was added to all batches before compounding to minimize oxidation. The extruder temperature was in the 200°–245° C. range. The extruded blends were molded into test specimens.

The test methods used to evaluate the molded specimens were ASTM D-256 (notched Izod impact at room temperature), ASTM D-638 (tensile strength), ASTM D-790 (flexural modulus), and ASTM-648 (Heat Distortion Temperature (HDT) at 1820 kPa).

EXAMPLES 1–2

Two polypropylene molding compositions of the invention were made and tested as described above. In these compositions the block copolymer was a S-EP-S-EP block copolymer. Two control compositions containing known styrene/butadiene block copolymers also were made and tested in the same manner.

The propylene polymer used in the preparation of the molding compositions was a pelletized polypropylene resin, commercially available from UBE (UBE ZT772), having a nominal melt flow rate (ASTM Method D 1238-82, 230° C./5 kg) of 66 dg/min.

The block copolymers are further,described in Table I and the polypropylene molding compositions and results of the evaluations performed on the Example 1 composition and the two control compositions are shown in Table II.

TABLE I

|  | Comparison Example No. | | Example No. | |
| --- | --- | --- | --- | --- |
|  | A[a] | B[b] | 1 | 2 |
| Multiblock/Diblock in Block Copolymer (wt %) | 100% S-EB-S | 70% S-EB-S 30% S-EB | 100% S-EP-S-EP | 100% S-EP-S-EP |
| Molecular Weight (peak) Multiblock/Diblock | 71,000 | 82,000 41,000 | 65,000 | 64,000 |
| Block Structure (peak MW for each block, × $10^3$) | — | — | 6.7 - 42.1 - 8.1 - 7.7 | 6.3 - 43 - 7.2 - 7.9 |
| Polystyrene (wt %)[c] | 30 | 13 | 23 | 21 |
| Melt Flow dg/min[d] | No Flow | 20–29 | 12.5 | 30 |
| Tensile strength psi | 3,100 | 2,550 | 2320 | 2030 |

[a]Commercially available-KRATON ® G1650 elastomer from Shell.
[b]Commercially available-KRATON ® G1657 elastomer from Shell.
[c]Measured prior to hydrogenation.
[d]ASTM D1238 (230° C./5 kg).

TABLE II

|  | Comparison Example No. | | Example No. |
| --- | --- | --- | --- |
| Polypropylene Comp.[a] | A | B | 1 |
| Heat Distortion Temperature (°C.) | 109.9 | 104.1 | 107.1 |
| Brittleness Temp. (°C.) | −37.6 | −40.8 | −47.0 |
| Izod Impact (Kg-cm/cm$^2$) | 15.8 | 21 | 43 |
| Melt Flow dg/min[b] | 40 | 59 | 59 |
| Flex Modulus (Kg/cm$^2$) | 12,450 | 12,070 | 12,700 |

[a]Contains 90% high flow polypropylene and 10% block copolymer with 0.08% Irganox 1010.
[b]ASTM D1238 (230° C./5 kg).

What is claimed is:

1. A polypropylene molding composition, consisting essentially of:

90% by weight of the polymer components of a high flow polypropylene having a melt flow from 50 to 80 dg/min;

10% by weight of the polymer components of a polystyrene-hydrogenated polyisoprene-polystyrene-hydrogenated polyisoprene block copolymer, wherein each polystyrene endblock has a peak molecular weight from 4,500 to 8,000, each hydrogenated polyisoprene midblock has a peak molecular weight from 35,000 to 55,000, each polystyrene midblock has a peak molecular weight from 4,500 to 9,000, and each hydrogenated polyisoprene endblock has a peak molecular weight that is from 15% to 35% of the peak molecular weight of the hydrogenated polyisoprene midblocks; and from 0 to 80 parts of a filler per 100 parts of the total polymer components.

2. The composition of claim 1, wherein each polystyrene endblock has a peak molecular weight from 5,500 to 7,000, each polyisoprene midblock has a peak molecular weight from 40,000 to 50,000, each polystyrene midblock has a peak molecular weight from 6,000 to 8,500, and each polyisoprene endblock has a peak molecular weight that is from 20% to 30% of the peak molecular weight of the hydrogenated polyisoprene midblocks.

* * * * *